US008256675B2

(12) United States Patent
Baglin et al.

(10) Patent No.: US 8,256,675 B2
(45) Date of Patent: Sep. 4, 2012

(54) VOLTAGE CONVERTER, USAGE OF A VOLTAGE CONVERTER, METHOD FOR CONVERTING AN AC VOLTAGE INTO A DC VOLTAGE, AND CONTACTLESS CHIP CARD

(75) Inventors: Thomas Jean Ludovic Baglin, Graz (AT); Josef Haid, Graz (AT); Walter Kargl, Graz (AT); Thomas Leutgeb, Lieboch (AT); Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 803 days.

(21) Appl. No.: 12/275,902

(22) Filed: Nov. 21, 2008

(65) Prior Publication Data
US 2009/0135635 A1  May 28, 2009

(30) Foreign Application Priority Data
Nov. 21, 2007  (DE) .................. 10 2007 055 538

(51) Int. Cl.
G06K 7/08  (2006.01)
G06K 19/06  (2006.01)

(52) U.S. Cl. ....................................... 235/451; 235/492

(58) Field of Classification Search .................. 235/451, 235/492
See application file for complete search history.

(56) References Cited

U.S. PATENT DOCUMENTS

| 6,031,419 | A | * | 2/2000 | Roberts et al. | ................ 329/349 |
| 6,134,130 | A | * | 10/2000 | Connell et al. | ................ 363/89 |
| 6,427,065 | B1 | * | 7/2002 | Suga et al. | .................. 455/41.1 |
| 7,703,677 | B2 | * | 4/2010 | Alihodzic | ...................... 235/451 |
| 2005/0205679 | A1 | * | 9/2005 | Alihodzic | ...................... 235/492 |
| 2007/0087719 | A1 | | 4/2007 | Mandal et al. | |

FOREIGN PATENT DOCUMENTS

| EP | 0681254 | 11/1995 |
| EP | 0740390 | 10/1996 |

OTHER PUBLICATIONS

Bruno Heller, "Modelleisenbahn-Elektronik von Anfang an," Franzis-Verlag, München, 1987, pp. 330-333—Partial translation—p. 331, 2nd paragraph and p. 333, central paragraph.

* cited by examiner

*Primary Examiner* — Bao Q Vu
(74) *Attorney, Agent, or Firm* — Dickstein Shapiro LLP

(57) ABSTRACT

The invention relates to a voltage converter comprising a rectification unit and a voltage regulation unit, wherein the input side of the voltage converter can have an AC voltage applied to it, the output side of the voltage converter can have a rectified voltage taken from it, and the voltage regulation unit regulates the power in the voltage converter.

25 Claims, 5 Drawing Sheets

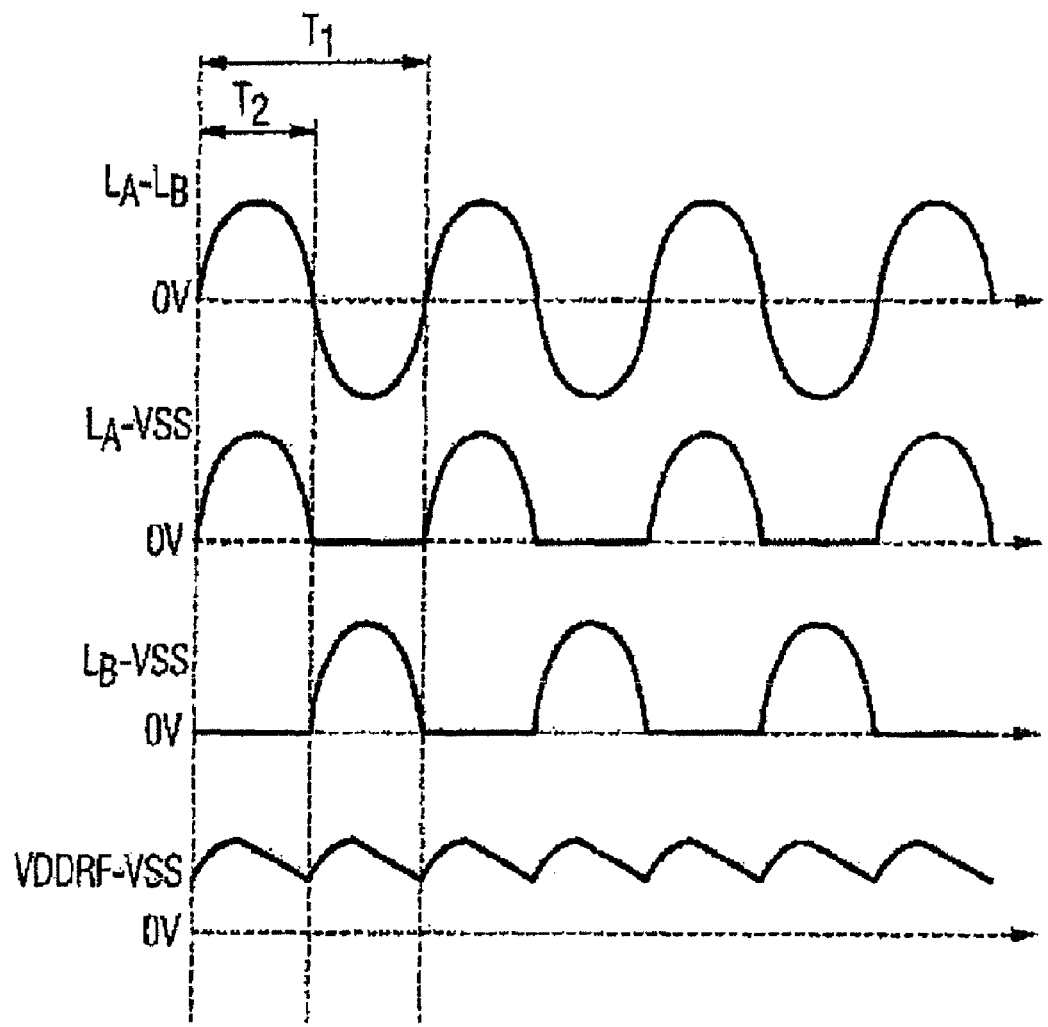

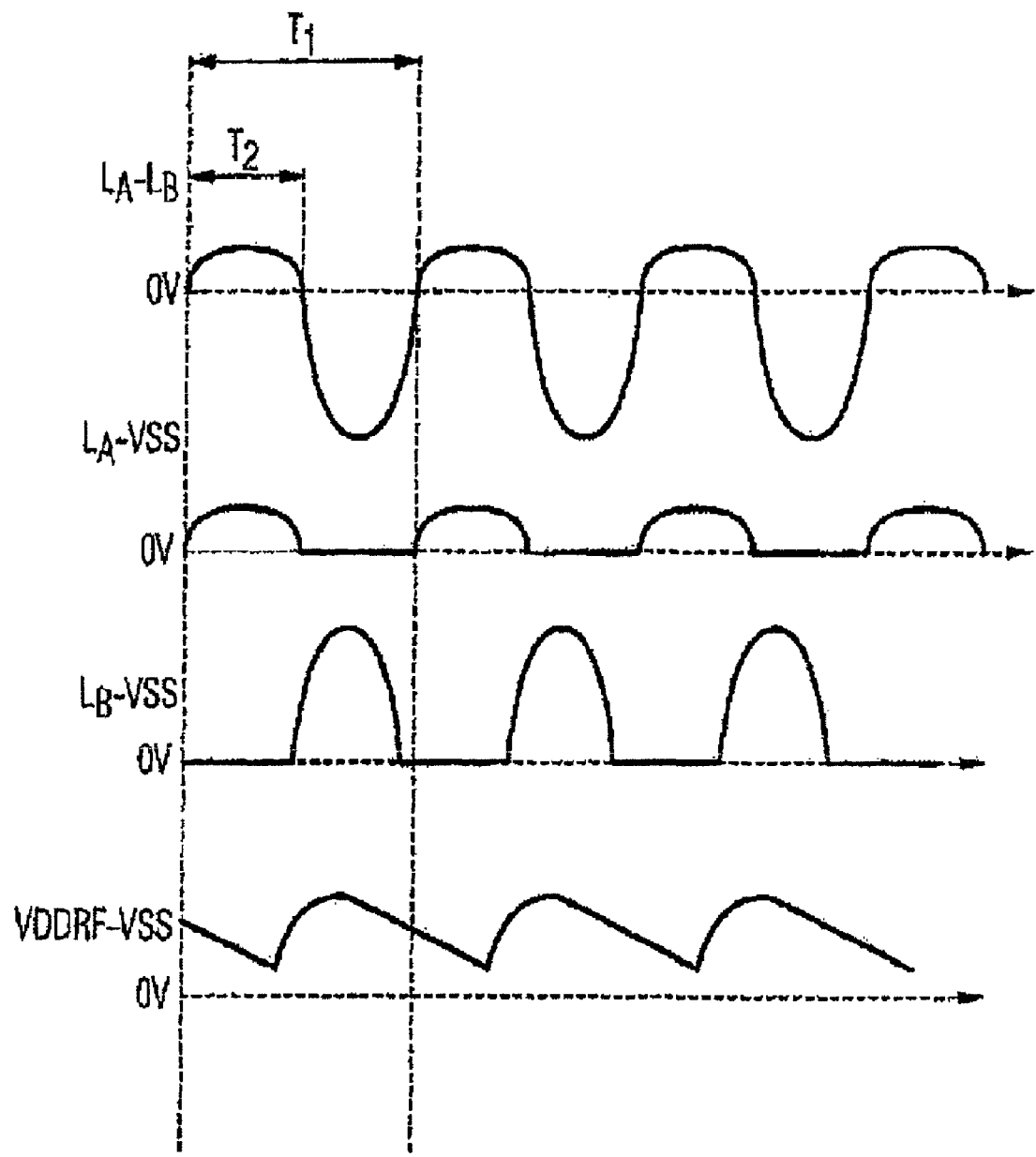

Figure 1:
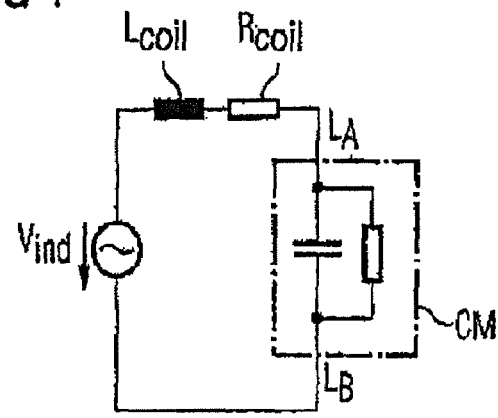

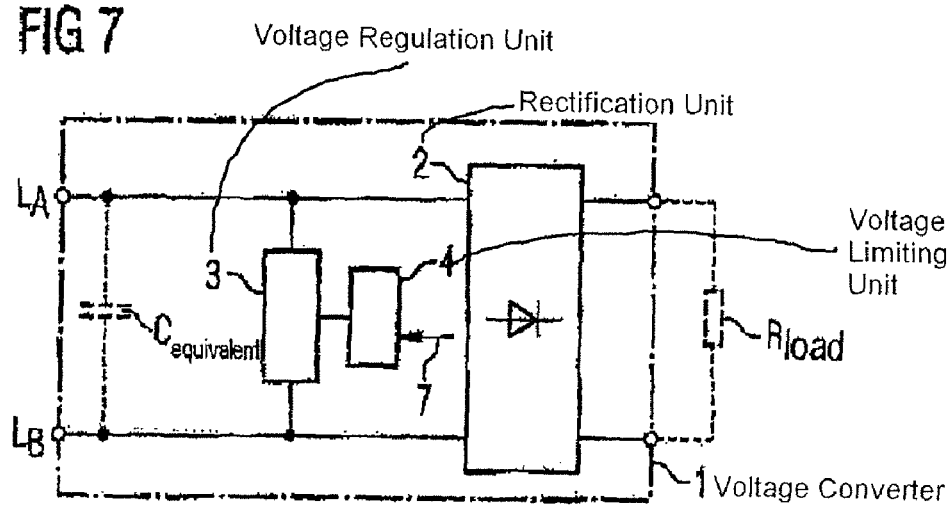
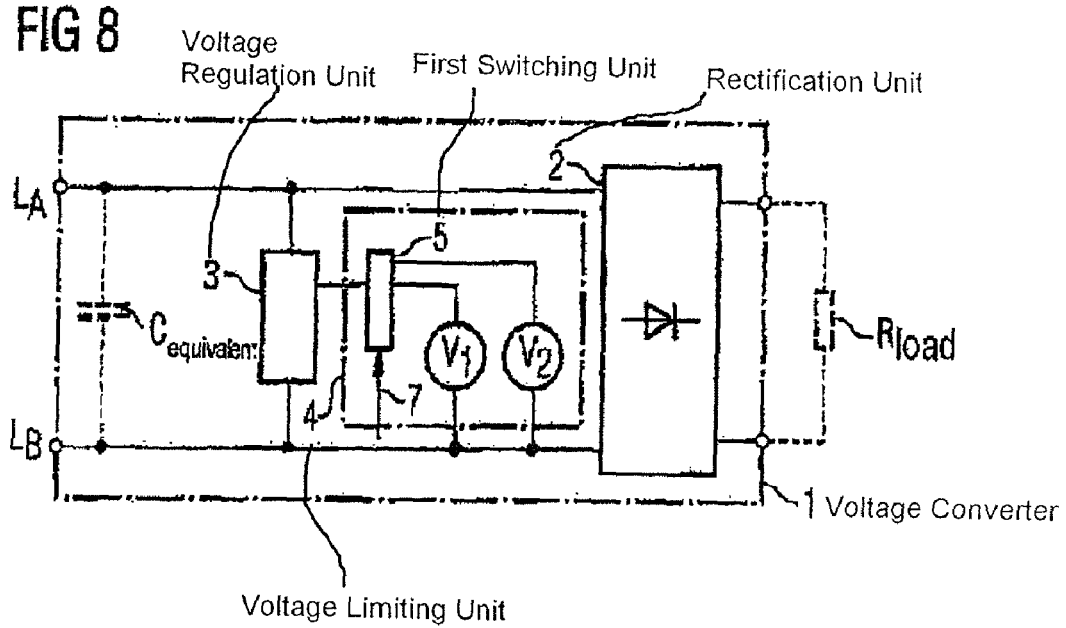

VOLTAGE CONVERTER, USAGE OF A VOLTAGE CONVERTER, METHOD FOR CONVERTING AN AC VOLTAGE INTO A DC VOLTAGE, AND CONTACTLESS CHIP CARD

The invention relates to a voltage converter and to the usage of a voltage converter and a method for converting an AC voltage into a DC voltage in a voltage converter comprising a rectification unit and a voltage regulation unit, wherein the voltage regulation unit regulates the power in the voltage converter.

In contactless chip cards and RFID, short for Radio Frequency Identification, -tags, the energy for supplying power to the chip card or the RFID tag is obtained from a received electromagnetic field. This electromagnetic field is converted into an electrical current or an electrical voltage by means of an antenna shaped as a coil. To this end, the chip card has at least two coil contacts to which the antenna coil is connected.

This antenna coil is able to receive an electromagnetic field emitted by a card reader. By way of example, data transmission can therefore be set up without a direct electrical connection between a chip card or an RFID tag and a card reader or a portal loop. The coil converts this electromagnetic field strength into an electrical current.

The power P converted in a chip module on a chip card is obtained from the product of the current induced in the coil and the voltage drop between the coil contacts.

The induced current is in turn dependent inter alia on the antenna geometry and the field strength of the applied field. At a maximum electromagnetic field strength, for example as a result of a minimally short distance between card reader and chip card, the coil current can be regarded as almost constant. Furthermore, for this maximum field strength, a high proportion of the induced energy is converted into power loss, since, as described at the outset, the chip module is operated at a constant voltage value. This power loss is released in the form of heat in a voltage converter on a chip card, for example. This process is also referred to as the self-heating effect.

For a maximum field strength, the induced current can be regarded as constant for a specific antenna design. This means that it can be assumed that for very high field strengths the power loss and hence the self-heating effect are linearly dependent on the voltage between the coil contacts.

This self-heating effect needs to be considered when the maximum operating temperature of the chip is being calculated. It should be ensured that a fixed operating point setting for the circuits is observed. In addition, to protect the users, it should also be ensured that the chip module does not overheat and accordingly does not become too hot on the housing surfaces.

The invention therefore relates to a voltage converter comprising a rectification unit, a voltage regulation unit, an input to which an AC voltage can be applied, an output from which a rectified voltage can be taken, wherein the voltage regulation unit is connected upstream or downstream of the rectification unit and the voltage regulation unit regulates the power in the voltage converter such that the power loss and hence a maximum temperature value are not exceeded.

In addition, the usage of such a voltage converter is provided. Furthermore, a method is also described in which an AC voltage is converted into a DC voltage, wherein an AC voltage is applied to the input side of a voltage converter, the power in the voltage converter is regulated such that the power loss and hence a maximum temperature value are not exceeded, the AC voltage is rectified before or after the power regulation and the rectified voltage is tapped off from the output side.

In addition, a method for operating a contactless chip card having a chip module, an antenna coil and a voltage converter is provided, wherein the antenna coil converts an electromagnetic field into an electrical AC voltage, the voltage converter converts this AC voltage into a rectified voltage and the chip module is supplied with the rectified voltage and wherein the voltage converter regulates the AC voltage such that the power loss from the chip card does not exceed a maximum temperature value.

Finally, a contactless chip card is provided, comprising an antenna which converts an electromagnetic field strength into an AC voltage, a voltage converter which converts the AC voltage into a rectified DC voltage, wherein the voltage converter has a rectification unit and a voltage regulation unit, the voltage regulation unit is connected upstream of the rectification unit, and the voltage regulation unit reduces the power loss on the chip card such that a maximum temperature is not exceeded.

Further embodiments of the invention are specified in the dependent claims.

Figure 2:
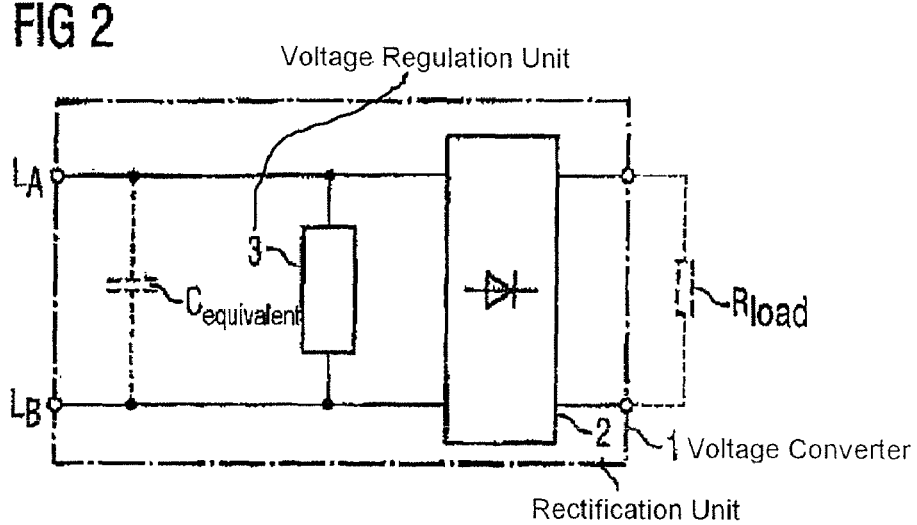
Figure 3:
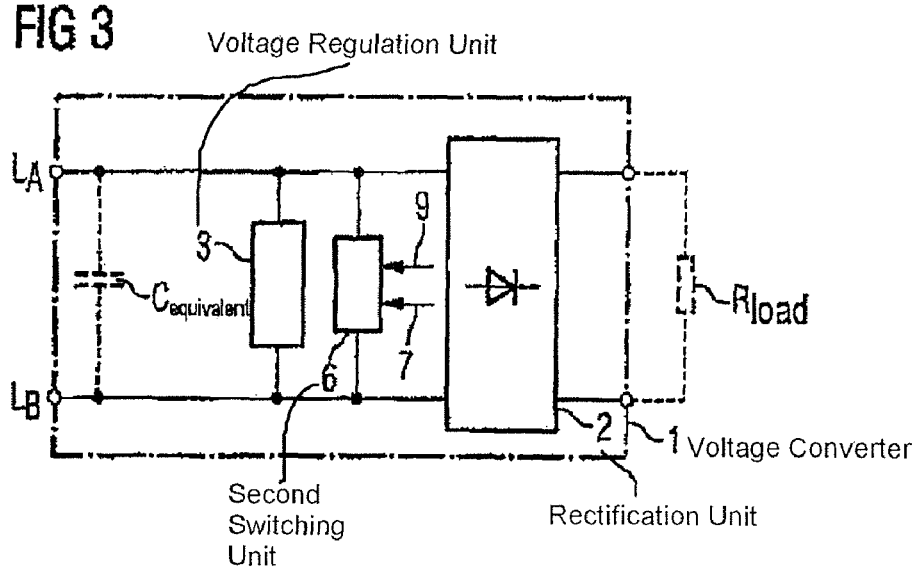
Figure 4:
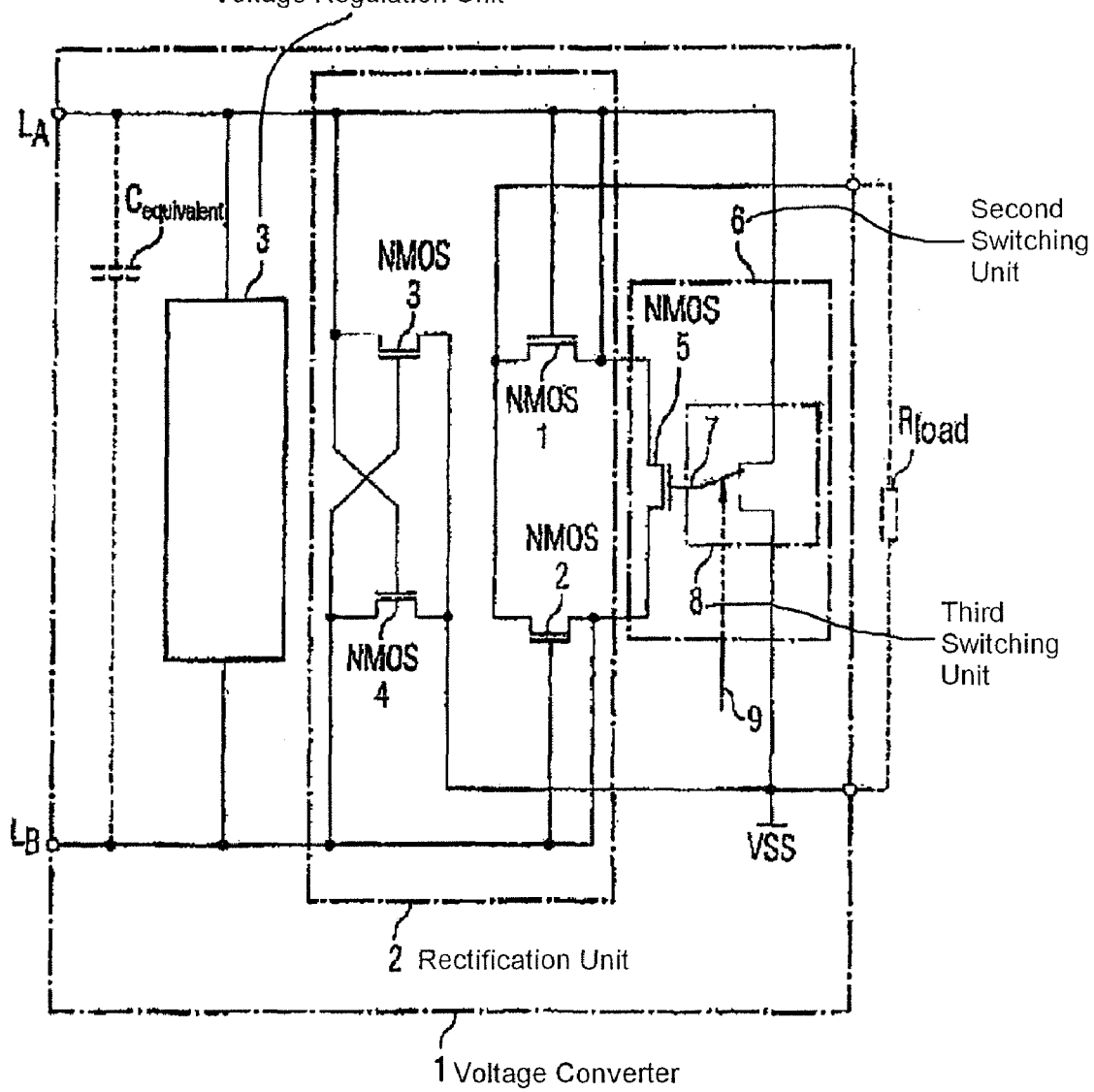

The text below explains the invention using exemplary embodiments with reference to the drawings, wherein components which are the same or have the same action are respectively identified by the same reference symbols in the figures. The elements shown should not be considered to be to scale, but rather individual elements may be shown exaggeratedly large or exaggeratedly simplified for the purpose of better understanding. In the drawings:

FIG. 1 shows an equivalent circuit diagram for a chip card,

FIG. 2 shows a block diagram of an exemplary embodiment for reducing self-heating, FIG. 3 shows a development of the exemplary embodiment shown in FIG. 2, FIG. 4 shows a circuit diagram for the development shown in FIG. 3, FIG. 5 shows a signal profile at important points in the circuit diagram of the exemplary embodiment without reduction of self-heating, FIG. 6 shows a signal profile graph at important points in the circuit diagram of the exemplary embodiment with reduction of self-heating, FIG. 7 shows an alternative exemplary embodiment to reduce self-heating, FIG. 8 shows a development of the exemplary embodiment shown in FIG. 7.

FIG. 1 shows an equivalent circuit diagram of a chip card. In this case, a chip module CM is represented by the parallel connection of two equivalent components, in this case a capacitor and a resistor. This chip module is arranged between the coil contacts LA and LB. The antenna coil is shown electrically in FIG. 1 by a series circuit comprising an inductance $L_{coil}$, its associated resistance loss $R_{coil}$ and the voltage $V_{ind}$ induced in the coil.

To operate the chip module, this induced voltage is converted into a rectified voltage and is regulated to a constant value. The constant voltage value ensures that the circuit parts of the downstream chip module are operated at a fixed operating point. For high electromagnetic field strengths, the coil voltage can be regarded as a very high voltage source with voltages >100 V. The inductance $L_{coil}$ with the reactance $X_L$ and the coil resistance loss $R_{coil}$ may be several hundred kiloohms.

One problem in this context is that the power consumption and hence linearly the self-heating effect in the chip rises when the receivable electromagnetic field strength rises. In this case, temperatures may reach degree values >100° C. which become very dangerous for a user. The maximum admissible temperature on or in the chip card is made up generally from the ambient temperature and the self-heating.

There is similarly no longer the assurance at these high temperatures that the chip and its circuit parts operate at the calculated ideal operating points. This results particularly in relatively high leakage currents, which in turn can result in ineffectiveness through to failure of individual switching units. This means that the operation of these circuit parts on the chip card is no longer assured and/or the effectiveness of the chip card is impaired.

To prevent the high power loss and hence this self-heating effect, the mathematical and physical laws mean that it is possible, by way of example, to reduce the RMS values of the voltages in order to rectify a reduced voltage and accordingly to convert less power in the chip module. Similarly, it is possible to rectify the voltage first of all and then to regulate or minimize it.

FIG. 2 shows an exemplary embodiment for reducing the power loss and hence reducing the self-heating. In this case, a voltage converter 1 comprises an input, represented by the coil contacts LA and LB, to which an AC voltage can be applied, a rectification unit 2, a voltage regulation unit 3 and an output from which a rectified voltage can be taken. Furthermore, the equivalent elements shown in FIG. 1, the load resistor $R_{load}$ and the equivalent capacitor $C_{equivalent}$, are shown symbolically. These two elements serve merely the purpose of understanding and do not contribute to the core idea of the invention.

The two coil contacts LA and LB now have the AC voltage U applied to them in induced form, or the coil L, which is not shown in this exemplary embodiment, converts a field strength into an AC voltage and provides it on the coil contacts LA and LB. The first coil contact LA is connected to a first connection of the equivalent capacitor $C_{equivalent}$. The second connection of the equivalent capacitor $C_{equivalent}$ is in turn connected to the second coil contact LB. Connected in parallel with the capacitor $C_{equivalent}$ are the voltage regulation unit 3, the rectification unit 2 and the load resistor $R_{load}$.

The voltage regulation unit 3 now ensures that, by way of example, a voltage value is not exceeded. The correlations mentioned at the outset comprising self-heating effect and voltage can be used to minimize a power loss and to prevent excessive self-heating or a maximum value for the temperature being exceeded when the voltage is reduced to a particular value. Connected in parallel with the voltage regulation unit 3 is the rectification unit 2. This rectification unit 2 rectifies the applied AC voltage into a rectified voltage. The output of the rectifier, the rectification unit, provides the DC voltage VDDRF. This DC voltage is now made available to a switching unit which follows the voltage converter, in this case represented by the load resistor $R_{load}$.

If an AC voltage is now applied to the input side of the core contacts LA and LB, it is first of all regulated to a constant voltage value in the voltage regulation unit 3. The voltage regulation unit comprises at least one shunt regulator and a voltage limiting unit. This ensures that the downstream chip module, represented by the load resistor $R_{load}$, is operated at a constant operating voltage. At this juncture, it should be pointed out that at no time in the power regulation and the resulting minimization of power loss are the downstream units of the chip module, or the downstream chip module, restricted in their function. In addition, the power loss of the voltage converter is regulated such that a particular maximum temperature value of the chip module is not exceeded. Maximum temperature value is firstly understood to mean that temperature value at which the efficiency of the chip module does not fall below a particular value, for example 90%, and the circuit parts operate at an optimum operating point. Secondly, the maximum temperature value is understood to mean that temperature of the chip card housing at which a user of the chip card suffers injuries as a result of burns upon touching the chip card.

The rectification unit 2 in turn converts the AC voltage into a rectified voltage, which in turn can be tapped off or taken from the output side.

In an alternative exemplary embodiment, which is not shown, the AC voltage is first of all converted into a rectified voltage by the rectification unit 2 and then the power loss of the rectified voltage is minimized.

FIG. 3 shows a development of the exemplary embodiment shown in FIG. 2. Only the difference between FIG. 2 and FIG. 3 is described below. In contrast with FIG. 2, FIG. 3 has a second switching unit 6 arranged and connected in parallel with the voltage regulation unit 3. The second switching unit 6 preferably additionally has a control signal 7.

The second switching unit 6 has at least two switching states. In the first switching state of the second switching unit 6, the input LA, LB is not shorted. In a second switching state of the second switching unit 6, the input is shorted. This shorting is effected briefly. In this case, briefly is understood to mean that the input is shorted for approximately half of the period duration of the applied AC voltage. This reduces the RMS value of the AC voltage and converts a smaller portion of the energy in the applied AC voltage into a rectified voltage.

Typically, data transmission between a card reader and a chip card takes place at a frequency of 13.56 MHz, which corresponds to a period duration of approximately 73.75 ns. If the second switching unit is now operated at twice the frequency in the second switching state, at least one half-cycle of the applied AC voltage is bypassed. The resulting frequency is then 27.12 MHz, or the period duration is 36.87 ns. Other data transmission frequencies and accordingly other shorting times are likewise conceivable in this case.

At the time in which the input is shorted, the power drawn by the chip module is approximately 0 watt, and the chip module continues to be supplied with voltage only by an internal capacitance at this time. This capacitance is preferably the total parasitic capacitance of the circuit, or a specifically provided backup capacitor. This shorting fundamentally does not influence and/or impair the operation of the chip card or of the RFID tag.

Alternatively, no additional space in the circuit arrangement is required, since a possible switch is possibly present in the shunt regulator, or generally the voltage regulation unit. In most chip card modules, an input shorting switch is furthermore already present within the voltage regulation unit 3 and is then used as a second switching unit.

The second switching unit 6 is preferably actuated by means of a control signal 7. In a first control state, this control signal 7 connects the first switching state of the second switching unit 6, and in a second control state, it connects the second switching state of the switching unit 6. This allows a transistor, for example, which has a control input, to be used to implement a second switching unit 6 of this kind inexpensively.

The second switching unit 6 is preferably activated by an activation signal 9. This activation signal 9 is ideally used to activate or generally deactivate the self-heating protection. In this case, this activation signal 9 can be generated by a wide variety of sources. By way of example, the activation signal 9 may be what is known as an alarm signal if it is established within the chip module CM that a particular overvoltage or increased self-heating is present. When the alarm signal signals an alarm, that is to say that increased power loss or self-heating is established in the chip module CM or the chip card, the second switching unit 6 is activated. This activation renders the second switching unit 6 capable of being switched to the two switching states described.

In another example, this activation signal 9 is generated by means of a piece of software. By way of example an application which is active within the chip module CM is able to identify whether a chip card is in a reset mode, in a bidirectional data transmission mode or in a reception standby mode. Depending on these modes of operation of the chip module CM the control signal 7 is configured such that it changes the switching state of the second switching unit 6. Since there is an increased power requirement when the circuit is in a bidirectional data transmission mode, for example, it is possible not to activate the self-heating protection in order to ensure constant and safe data transmission. If the chip module CM is only in a reception standby mode (listening mode), on the other hand, a lower RMS value is sufficient to ensure the desired operation of the chip module CM. Activation of the self-heating protection and the resulting reduction in the RMS value of the voltage reduce the power loss and hence the self-heating.

In addition, it is possible to implement a temperature sensor in the chip module CM, on the chip card in general or on the RFID tag. An alarm signal, generated by the temperature sensor or a field strength measurement or a current rise measurement, may be this activation signal.

FIG. 4 shows a simplified circuit diagram of the block diagram of the exemplary embodiment shown in FIG. 3. The elements in FIG. 3 are shown in dashes in FIG. 4. Connected in parallel with the equivalent capacitor $C_{equivalent}$ is again the voltage regulation unit 3. The rectification unit 2 is in the form of a transistor circuit in FIG. 4. The field effect transistors NMOS1, NMOS2, NMOS3 and NMOS4 are preferably operated as diodes. The equivalent circuit diagram of the rectification unit 2 shown in FIG. 4 is the classical bridge rectifier. A detailed description of a bridge rectifier is omitted at this juncture, and reference is made to the relevant literature.

At the source output of the NMOS3, which is connected to the drain connection of the NMOS4, the reference potential VSS is defined. At the source output of the NMOS2, in turn coupled to the drain connection of the NMOS1 transistor, the DC voltage VDDRF is defined. Between VDDRF and VSS, there is again the load resistor $R_{load}$, which is shown as being representative of subsequent circuit parts of the chip module CM.

Appropriate voltage/time profiles can be seen in FIGS. 5 and 6. Situated between the drain connection of the NMOS1 and the source connection of the NMOS2 is the second switching unit 6. The second switching unit 6 is connected to the third switching unit 8 by the control signal 7. The third switching unit 8 has an input and an output. The input is the activation signal 9, which can be used to activate or deactivate the second switching unit. The output of the third switching unit 8 is connected to the second switching unit 6 and produces the control signal 7. In addition, the third switching unit 8 is connected to the reference potential VSS and to the first coil contact LA.

The text below explains the way in which the circuit works with reference to FIG. 5 and FIG. 6. The coil contacts LA and LB have an AC voltage at a particular frequency applied to them. The AC voltage is now considered with reference to its two half-cycles, where the positive half-cycle is the first half-cycle and the negative half-cycle is the second half-cycle of the AC voltage.

The second switching unit 6 is now used to short or not to short the two coil contacts LA and LB. The third switching unit 8 provides the control signal 7 for the second switching unit 6. Depending on the activation signal 9, the third switching unit 8 is connected either to reference potential VSS or to the first coil contact LA. The origin of the activation signal has been explained in detail in the description of the figures relating to FIG. 3. Depending on the state of the control signal 7 from the third switching unit 8, the gate connection of the transistor NMOS5 inside the second switching unit 6 is coupled to potential LA or reference potential VSS. This transistor NMOS5 is subsequently called the switching transistor and ideally has the task of not briefly shorting the coil contacts LA and LB in a first switching state and of shorting them in a second switching state.

In FIG. 4, the NMOS5 gate is connected to the first coil contact LA. In this wiring arrangement, the self-heating protection is activated, which means that the positive half-cycle of the AC voltage which can be applied is constantly bypassed by the transistor NMOS5 and placed at reference potential VSS. An appropriate signal profile can be seen in FIG. 6, the profile of the voltage between LA and LB. The positive half-cycle of the AC voltage which can be applied is more or less forced to reference potential VSS by the second switching unit 6.

In a variant of FIG. 4 which is not shown, the gate of the NMOS transistor 5 is at reference potential VSS. Respectively, the signal profiles shown in FIG. 5 now apply. As can be seen, the voltage profile on the coil contacts LA and LB is that of a normal sinusoidal voltage, and the positive half-cycle is accordingly fully connected. This means that the self-heating protection is deactivated and the activation signal 9 is in the inactive state. In such a mode, the higher voltage allows safe data transmission to be ensured.

FIG. 5 shows four voltage profiles for the circuit shown in FIG. 4. The signal profiles are achieved when the gate of the switching transistor NMOS5 is placed at reference potential VSS. This is achieved by connecting the third switching unit 8 to reference potential VSS by means of the control signal 7. The voltage profile between the coil contacts LA and LB equates to an applied AC voltage, for example a sinusoidal voltage. The voltages LA-VSS and LB-VSS are achieved by the transistors NMOS3 and NMOS4. In this case, the reference potential VSS is engaged on the basis of the respective positive or negative half-cycles of the AC voltage. The pulsating DC voltage VDDRF-VSS is shown in the fourth signal profile. It can clearly be seen that a coupling capacitor, not shown, is charged to the peak voltage of LA-LB and discharges slightly up to the appearance of the rectified negative half-cycle and is recharged only by the second negative half-cycle. The circuit accordingly operates like a rectifier and has a relatively high RMS value.

If the switching transistor NMOS 5 is now connected to the first coil contact LA by the activation signal 9, the signal profiles shown in FIG. 6 are achieved. As mentioned in the description of the figures for FIG. 4, the positive half-cycle of the applied AC voltage is suppressed in this case, which reduces the RMS value of the total applied AC voltage and means that a reduced VDDRF is applied as a result. The suppression of the positive half-cycle is not achieved completely in this case, since either a parasitic capacitance or a backup capacitance continues to supply the chip module with voltage. The suppression of the positive half-cycle displaces the voltage profile of LB-VSS. This can be explained by simple arithmetical correlations when considering the voltages, this not being discussed in more detail at this juncture.

FIG. 7 shows an alternative exemplary embodiment in which a voltage converter reduces the power loss and hence the self-heating of a chip module. The text below merely demonstrates the difference from FIG. 2. In contrast to FIG. 2, FIG. 7 shows a voltage limiting unit 4 which is connected to the voltage regulation unit 3. The voltage limiting unit 4 in turn has units which can be used to preset a reference voltage value for the voltage regulation unit 3. Preferably, the voltage limiting unit 4 is controlled by means of a control signal 7.

In this case, the control signal 7 is generated in a similar manner to that already explained in the description of FIG. 3. The reference voltage values set the maximum voltage value of the voltage regulation unit 3 to which the voltage regulation unit 3 regulates the AC voltage which can be applied. When a first reference voltage value V1 is connected to the voltage regulation unit 3, the chip module CM is in a first mode of operation, in which the power loss and hence the self-heating are low. When the control signal 7 connects a second reference voltage value V2 to the voltage regulation unit, where V2 is greater than V1, the chip module CM is in a second mode of operation, where the self-heating is correspondingly higher.

In the first mode of operation of the chip module CM, a reception mode, also known as listening mode, is activated, for example, whereas in the second mode of operation of the chip module CM, a data transmission mode is set. It is advantageous for the control signal 7 to be provided with a time delay, which means that first of all a second reference voltage value V2 is supplied to the voltage regulation unit 3 and after a particular period T has elapsed the reference voltage value V1 is supplied.

The higher value of the voltage V2 allows safe data transmission. With a lower voltage V1, lower self-heating can be expected.

Alternatively, a continuously adjustable voltage value may be connected to the voltage regulation unit 3. This continuously adjustable voltage value is set according to the power loss arising and hence the self-heating arising. It is set either in the voltage limiting unit 4 or by the control signal 7.

Similarly, in an alternative exemplary embodiment, provision is made for the power to be regulated and hence the power loss to be minimized only after the rectification of the AC voltage by the rectification unit 4 into a rectified DC voltage.

FIG. 8 shows a more detailed description of the exemplary embodiment shown in FIG. 7. Here, the voltage limiting unit 4 contains a first switching unit 5 and two reference voltage sources V1 and V2. The reference voltage sources V1 and V2 are connected to the first switching unit 5. The first switching unit 5 additionally has an input to which the control signal 7 can be applied. Depending on the control signal 7, a first switching state will apply the first reference voltage value V1 to the voltage regulation unit 3, whereas an inverted control signal 7 connects the reference voltage value V2 to the voltage regulation unit 3. The origin of the control signal 7 is shown adequately in the description of FIG. 3.

In addition, provision is made for the voltage converter to be implemented in a chip card. Furthermore, the coil inputs LA and LB can have a coil, with an inductance L, coupled to them which takes an electromagnetic field and produces an electrical current. In one advantageous refinement, the first, the second and the third switching unit respectively have a single transistor which operates as a switching transistor. These switching transistors are possibly already implemented in a shunt regulator, which can also be regarded as a voltage regulation unit, which means that no additional space is required within the circuit arrangement.

The voltage converter is not limited to an application in the field of chip cards.

The fact that an almost constant current is assumed in the application means that the power loss and hence the self-heating can be regulated by means of the voltage.

The invention claimed is:

1. A voltage converter comprising:
a rectification unit,
a voltage regulation unit,
an input to which an AC voltage can be applied,
an output configured to provide a rectified voltage which can be tapped,
wherein
the voltage regulation unit regulates the power in the voltage converter such that the power loss is minimized and values of a capacitor and/or inductor of a resonant circuit are maintained.

2. The voltage converter as claimed in claim 1, wherein the voltage regulation unit comprises a voltage limiting unit.

3. The voltage converter as claimed in claim 2, wherein at least two different voltage values are settable in the voltage limiting unit.

4. The voltage converter as claimed in claim 2, wherein a continuously adjustable voltage value is settable in the voltage limiting unit.

5. The voltage converter as claimed in claim 3, wherein
the voltage limiting unit comprises a first switching unit,
the first switching unit comprises at least two switching states,
the first switching unit connects a first voltage value to the voltage regulation unit in a first switching state, and
the first switching unit connects a second voltage value to the voltage regulation unit in a second switching state.

6. The voltage converter as claimed in claim 5, wherein the first switching unit changes the switching states using a control signal.

7. The voltage converter as claimed in claim 1, wherein
a second switching unit is arranged in parallel with the voltage regulation unit,
the second switching unit comprises at least two switching states,
the second switching unit does not short the input in a first switching state, and
the second switching unit shorts the input in a second switching state.

8. The voltage converter as claimed in claim 7, wherein the second switching unit changes the switching states using a control signal.

9. The voltage converter as claimed in claim 7, wherein an activation signal can be used to activate the second switching unit in a first control state of the activation signal and to deactivate the second switching unit in a second control state of the activation signal.

10. The voltage converter as claimed in claim 7, wherein the second switching unit is a transistor.

11. The voltage converter as claimed in claim 7, wherein the second switching unit remains in the second switching state for half of the period duration of the applied AC voltage.

12. The voltage converter as claimed in claim 1, wherein the rectification unit is a bridge rectifier and the diodes of the bridge rectifier are implemented by transistors.

13. The voltage converter as claimed in claim 1, wherein the AC voltage which can be applied to the input side is produced from an electromagnetic field by means of a coil.

14. The voltage converter as claimed in claim 1, wherein the DC voltage which can be taken from the output side is used to operate a contactless chip card with a chip module.

15. The voltage converter as claimed in claim 1, wherein the functionality is not altered by units connected downstream of the voltage converter.

16. The usage of a voltage converter as claimed in claim 1 in a chip module on a contactless chip card, wherein an induced current is directly proportional to a received electromagnetic field as a result of the geometry of the chip card antenna.

17. A method for converting an AC voltage into a DC voltage in a voltage converter, wherein:
   an AC voltage is applied to the input side of the voltage converter,
   the power in the voltage converter is regulated such that the power loss is minimized and values of a capacitor and/or inductor of a resonant circuit are maintained, and
   the rectified voltage is tapped off on the output side.

18. The method as claimed in claim 17, wherein the AC voltage is regulated by generating a first switching signal and wherein the first switching signal connects a first voltage value for regulation purposes in a first switching state and connects a second voltage value for regulation purposes in a second switching state.

19. The method as claimed in claim 17, wherein the AC voltage is regulated by generating a second switching signal and wherein a first switching state of the second switching signal does not bypass the input and a second switching state of the second switching signal bypasses the input at least briefly.

20. The method as claimed in claim 19, wherein the second switching state of the second switching signal bypasses the input for half of the period duration of the AC voltage.

21. The method as claimed in claim 17, wherein the AC voltage is rectified by means of a bridge rectification circuit, and this bridge rectification circuit is implemented by means of transistors.

22. A method for operating a contactless chip card comprising a chip module, an antenna coil and a voltage converter, wherein:
   the antenna coil converts an electromagnetic field into an electrical AC voltage,
   the voltage converter converts this AC voltage into a rectified voltage, and
   the chip module is supplied with the rectified voltage, and
   wherein the voltage converter regulates the AC voltage such that the power loss of the chip card does not exceed a maximum temperature value and values of a capacitor and/or inductor of a resonant circuit are maintained.

23. The method as claimed in claim 22, wherein
   the voltage converter generates a first switching signal,
   the first switching signal sets a first voltage reference value in the voltage converter in a first switching state, and
   the first switching signal sets a second voltage reference value in the voltage converter in a second switching state.

24. The method as claimed in claim 22, wherein
   the voltage converter generates a second switching signal,
   the second switching signal does not short the antenna of the chip card in a first switching state, and
   the second switching signal shorts the antenna of the chip card for half of a period duration of the AC voltage in a second switching state.

25. A contactless chip card comprising:
   an antenna which converts an electromagnetic field strength into an AC voltage,
   a voltage converter which converts the AC voltage into a rectified DC voltage,
   wherein:
      the voltage converter has a rectification unit and a voltage regulation unit,
      the voltage regulation unit is connected upstream of the rectification unit,
      the voltage regulation unit reduces the power loss on the chip card such that a maximum temperature is not exceeded and values of a capacitor and/or inductor of a resonant circuit are maintained.

* * * * *